United States Patent
Copeland (10) Patent No.: US 10,972,608 B2
(45) Date of Patent: Apr. 6, 2021

(54) ASYNCHRONOUS MULTI-DIMENSIONAL PLATFORM FOR CUSTOMER AND TELE-AGENT COMMUNICATIONS

(71) Applicant: N3, LLC, Atlanta, GA (US)

(72) Inventor: Shannon Copeland, Atlanta, GA (US)

(73) Assignee: N3, LLC, Atlanta, GA (US)

( * ) Notice: Subject to any disclaimer, the term of this patent is extended or adjusted under 35 U.S.C. 154(b) by 0 days.

(21) Appl. No.: 16/947,802

(22) Filed: Aug. 17, 2020

(65) Prior Publication Data

US 2020/0382642 A1  Dec. 3, 2020

Related U.S. Application Data

(63) Continuation-in-part of application No. 16/911,717, filed on Jun. 25, 2020, which is a continuation of
(Continued)

(51) Int. Cl.
*H04M 3/51* (2006.01)
*G06Q 30/00* (2012.01)
(Continued)

(52) U.S. Cl.
CPC ...... *H04M 3/5183* (2013.01); *G06F 16/9024* (2019.01); *G06N 3/006* (2013.01);
(Continued)

(58) Field of Classification Search
CPC .. H04M 3/5183; H04M 3/5166; G06N 3/006; H04L 51/02
(Continued)

(56) References Cited

U.S. PATENT DOCUMENTS 6,785,380 B2   8/2004  Ribera
6,829,603 B1   12/2004 Chai et al.
(Continued)

FOREIGN PATENT DOCUMENTS

KR  1020180058877     7/2018
WO     20160139666 A1  9/2016

OTHER PUBLICATIONS

Jan. 10, 2020 Office Action for corresponding U.S. Appl. No. 15/700,210.
(Continued)

*Primary Examiner* — Thjuan K Addy
(74) *Attorney, Agent, or Firm* — OhanianIP Law Offices; H. Artoush Ohanian (57) ABSTRACT

Customer relationship management ('CRM') implemented in a computer system, including administering, by a CRM application of the computer system, with one or more customer representative on behalf of one or more tele-agents asynchronously across one or more platform types, as structure of computer memory of the computer system, a communications session comprising one or more communications contacts with the customer representative in support of the communications session. Digital transcripts of previous contacts are displayed for a tele-agent in real to facilitate communications with the customer representative. The transcripts and associated data are stored as parsed and inferred semantic triples in an enterprise knowledge graph.

20 Claims, 3 Drawing Sheets

Related U.S. Application Data application No. 16/183,736, filed on Nov. 8, 2018, now Pat. No. 10,742,813.

(51) Int. Cl.
  *H04L 12/58* (2006.01)
  *G06F 16/901* (2019.01)
  *G06N 3/00* (2006.01)
(52) U.S. Cl.
  CPC .......... *G06Q 30/016* (2013.01); *H04L 51/02* (2013.01); *H04M 3/5166* (2013.01)
(58) Field of Classification Search
  USPC ............ 379/265.03, 265.02, 265.11, 265.05, 379/265.01
  See application file for complete search history.

(56) References Cited

U.S. PATENT DOCUMENTS

| | | |
|---|---|---|
| 7,275,083 B1 | 9/2007 | Seibel et al. |
| 7,486,785 B2 | 2/2009 | Flores |
| 8,108,237 B2 | 1/2012 | Bourne et al. |
| 8,332,279 B2 | 12/2012 | Woolston |
| 3,411,843 A1 | 4/2013 | Cyriac |
| 9,049,295 B1 | 6/2015 | Cooper |
| 9,165,556 B1 | 10/2015 | Sugar |
| 9,848,082 B1 | 12/2017 | Lilland |
| 9,860,391 B1 | 1/2018 | Wu et al. |
| 9,936,066 B1* | 4/2018 | Mammen ................ G10L 15/26 |
| 9,942,779 B1* | 4/2018 | Proctor ................. H04L 43/045 |
| 9,948,783 B1 | 4/2018 | Farrell |
| 10,026,092 B2 | 7/2018 | Heater et al. |
| 10,057,423 B1 | 8/2018 | Sheikh |
| 10,101,976 B2 | 10/2018 | Cavalcante |
| 10,303,466 B1 | 5/2019 | Karman |
| 10,482,384 B1 | 11/2019 | Stoilos |
| 2003/0126136 A1 | 7/2003 | Omoigui |
| 2004/0143473 A1 | 7/2004 | Tivey et al. |
| 2004/0210881 A1 | 10/2004 | Friedman |
| 2005/0005266 A1 | 1/2005 | Datig |
| 2005/0044357 A1 | 2/2005 | Fano |
| 2005/0105712 A1 | 5/2005 | Williams et al. |
| 2006/0095273 A1 | 5/2006 | Montvay et al. |
| 2006/0098625 A1 | 5/2006 | King |
| 2006/0239439 A1 | 10/2006 | Blackwood |
| 2007/0019618 A1 | 1/2007 | Shaffer |
| 2007/0064913 A1 | 3/2007 | Shaffer |
| 2007/0094183 A1 | 4/2007 | Paek et al. |
| 2007/0233561 A1 | 10/2007 | Golec |
| 2008/0162498 A1 | 7/2008 | Omoigui |
| 2008/0275744 A1 | 11/2008 | Macintyre et al. |
| 2009/0070322 A1 | 3/2009 | Salvetti |
| 2009/0132474 A1 | 5/2009 | Ma |
| 2009/0245500 A1 | 10/2009 | Wampler |
| 2009/0271192 A1 | 10/2009 | Marquette |
| 2010/0010802 A1 | 1/2010 | Ruano |
| 2010/0036788 A1 | 2/2010 | Wu |
| 2010/0063799 A1 | 3/2010 | Jamieson |
| 2010/0114563 A1 | 5/2010 | Choi |
| 2011/0077999 A1 | 3/2011 | Becker et al. |
| 2011/0082829 A1 | 4/2011 | Kolovski |
| 2011/0113094 A1 | 5/2011 | Chunilal |
| 2011/0206198 A1 | 8/2011 | Freedman |
| 2011/0264451 A1 | 10/2011 | Hoepfinger |
| 2012/0059776 A1 | 3/2012 | Estes |
| 2012/0078636 A1 | 3/2012 | Ferrucci |
| 2012/0233558 A1 | 9/2012 | Naim |
| 2012/0275642 A1 | 11/2012 | Aller |
| 2012/0303355 A1 | 11/2012 | Liu et al. |
| 2013/0091090 A1 | 4/2013 | Spivack et al. |
| 2013/0006916 A1 | 6/2013 | Mcbride |
| 2013/0163731 A1 | 6/2013 | Yan |
| 2013/0204663 A1 | 8/2013 | Kahlow |
| 2014/0022328 A1 | 1/2014 | Gechter et al. |
| 2014/0081585 A1 | 3/2014 | Cappucino et al. |
| 2014/0081934 A1 | 3/2014 | Mizell |
| 2014/0122535 A1 | 5/2014 | Gerard |
| 2014/0164502 A1 | 6/2014 | Khodorenko |
| 2014/0189680 A1 | 7/2014 | Kripalani |
| 2014/0201234 A1 | 7/2014 | Lee et al. |
| 2014/0270108 A1 | 9/2014 | Riahi et al. |
| 2014/0278343 A1 | 9/2014 | Tran |
| 2014/0314225 A1 | 10/2014 | Riahi |
| 2014/0372630 A1 | 12/2014 | Bostick |
| 2014/0379755 A1 | 12/2014 | Kuriakose |
| 2015/0012350 A1 | 1/2015 | Li et al. |
| 2015/0066479 A1 | 3/2015 | Pasupalak |
| 2015/0189085 A1 | 7/2015 | Riahi et al. |
| 2015/0201077 A1 | 7/2015 | Konig et al. |
| 2015/0242410 A1 | 8/2015 | Pattabhiraman et al. |
| 2015/0254234 A1 | 9/2015 | Dixit et al. |
| 2015/0261743 A1 | 9/2015 | Sengupta |
| 2015/0294405 A1 | 10/2015 | Hanson |
| 2015/0309994 A1 | 10/2015 | Liu |
| 2015/0348551 A1 | 12/2015 | Gruber |
| 2015/0379603 A1 | 12/2015 | Gupta |
| 2016/0019882 A1 | 1/2016 | Matula |
| 2016/0021181 A1 | 1/2016 | Ianakiev et al. |
| 2016/0034457 A1 | 2/2016 | Bradley |
| 2016/0036981 A1 | 2/2016 | Hollenberg |
| 2016/0036982 A1 | 2/2016 | Ristock |
| 2016/0036983 A1 | 2/2016 | Korolev |
| 2016/0117593 A1 | 4/2016 | London |
| 2016/0162913 A1 | 6/2016 | Linden et al. |
| 2016/0171099 A1 | 6/2016 | Lorge et al. |
| 2016/0188686 A1 | 6/2016 | Hopkins |
| 2016/0189028 A1 | 6/2016 | Hu et al. |
| 2016/0217479 A1 | 7/2016 | Kashyap et al. |
| 2016/0239851 A1 | 8/2016 | Tanner |
| 2016/0162474 A1 | 9/2016 | Agarwal |
| 2016/0321748 A1 | 11/2016 | Mahatm |
| 2016/0335544 A1 | 11/2016 | Bretschneider et al. |
| 2017/0017694 A1 | 1/2017 | Roytman et al. |
| 2017/0024375 A1 | 1/2017 | Hakkani-Tur |
| 2017/0091390 A1 | 3/2017 | Joul |
| 2017/0124193 A1 | 5/2017 | Li |
| 2017/0147635 A1 | 5/2017 | Mcateer et al. |
| 2017/0154108 A1 | 6/2017 | Li et al. |
| 2017/0177715 A1 | 6/2017 | Chang |
| 2017/0200220 A1 | 7/2017 | Nicholson |
| 2017/0195488 A1 | 8/2017 | Pendyaia |
| 2017/0262429 A1 | 9/2017 | Harper |
| 2017/0262530 A1 | 9/2017 | Okura |
| 2017/0293610 A1 | 10/2017 | Tran |
| 2018/0082183 A1 | 3/2018 | Hertz et al. |
| 2018/0115644 A1 | 4/2018 | Al-Khaja |
| 2018/0144250 A1 | 5/2018 | Kwon |
| 2018/0150459 A1 | 5/2018 | Farid |
| 2018/0288098 A1 | 10/2018 | Wang |
| 2018/0300310 A1 | 10/2018 | Shinn |
| 2018/0315000 A1 | 11/2018 | Kulkarni |
| 2018/0315001 A1 | 11/2018 | Garner |
| 2018/0338040 A1 | 11/2018 | Carly |
| 2018/0365772 A1 | 12/2018 | Thompson |
| 2018/0376002 A1 | 12/2018 | Abraham |
| 2019/0042988 A1 | 2/2019 | Brown |
| 2019/0080370 A1 | 3/2019 | Copeland |
| 2019/0188617 A1 | 6/2019 | Copeland |
| 2019/0206400 A1 | 7/2019 | Cui |
| 2019/0220794 A1 | 7/2019 | Kulkarni |
| 2019/0340294 A1 | 11/2019 | Spangler |
| 2020/0042642 A1 | 2/2020 | Bakis |
| 2020/0097814 A1 | 3/2020 | Devesa |
| 2020/0110835 A1 | 4/2020 | Zhao |

OTHER PUBLICATIONS

Jan. 25, 2020 Office Action for corresponding U.S. Appl. No. 15/844,512.

Jul. 25, 2019 Office Action for corresponding U.S. Appl. No. 16/198,742.

(56) References Cited

OTHER PUBLICATIONS

Final Office Action dated Jul. 27, 2020 for corresponding U.S. Appl. No. 15/844,512.
Final Office Action dated Jul. 30, 2020 for corresponding U.S. Appl. No. 16/154,718.
Final Office Action dated Jul. 7, 2020 for corresponding U.S. Appl. No. 15/700,210.
Mar. 5, 2020 Office Action for corresponding U.S. Appl. No. 16/183,736.
May 4, 2020 Office Action for corresponding U.S. Appl. No. 16/154,718.
Non-Final Office Action dated Sep. 29, 2020 for corresponding U.S. Appl. No. 16/157,075.
Non-Final Office Action dated Sep. 30, 2020 for corresponding U.S. Appl. No. 16/911,717.
Oct. 19, 2020 Notice of Allowance for corresponding U.S. Appl. No. 16/157,075.
Liew. "Strategic integration of knowledge management and customer relationship 1-20 management." In: Journal of Knowledge Management. Jul. 18, 2008 (Jul. 18, 2008) Retrieved on Dec. 25, 2019 (Dec. 25, 2019) from <http://student.bms.lk/GDM/49/Slides/MarManaSampleAssi/MMAsuportingJouArti/13673270810884309.pdf> entire document.
Tung. "Google's human-sounding AI to answer calls at contact centers." In: ZDNet. Jul. 25, 2018 (Jul. 25, 2018) Retrieved on Dec. 25, 2019 (Dec. 25, 2019) from <https://www.zdnet.com/article/googles-human-sounding-ai-to-answer-calls-at-contact-centers/> entire document.
International Search Report and Written Opinion dated Jan. 9, 2020 for PCT/US2019/055488.
International Search Report and Written Opinion dated Jan. 14, 2020 for PCT/US2019/060174.
International Search Report and Written Opinion dated Jan. 17, 2020 for PCT/US2019/058997.
International Search Report and Written Opinion dated Feb. 22, 2019 for PCT/US2018/065584.
International Search Report and Written Opinion dated Mar. 9, 2020 for PCT/US2019/059949.
International Search Report and Written Opinion dated Apr. 1, 2020 for PCT/US2019/055483.
International Search Report and Written Opinion dated Nov. 28, 2018 for PCT/US2018/049813.
International Search Report and Written Opinion dated Dec. 30, 2019 for PCT/US2019/062629.

* cited by examiner

ASYNCHRONOUS MULTI-DIMENSIONAL PLATFORM FOR CUSTOMER AND TELE-AGENT COMMUNICATIONS

CROSS REFERENCE TO RELATED APPLICATIONS

The present application is a continuation-in-part of U.S. application Ser. No. 16/154,718, filed on Oct. 9, 2018, the disclosure of which is incorporated herein in its entirety by reference. The present application is also a continuation-in-part of U.S. application Ser. No. 16/911,717, filed on Jun. 25, 2020, which is a continuation of U.S. application Ser. No. 16/183,736, filed on Nov. 8, 2018, the disclosures of which are incorporated herein in their entirety by reference.

BACKGROUND

Customer Relationship Management ('CRM') is an approach to managing a company's interaction with current and potential customers. CRM implements data analysis of customers' history with a company to improve business relationships with customers, specifically focusing on customer retention and sales growth. CRM systems compile data from a range of communication channels, including telephone, email, live chat, text messaging, marketing materials, websites, and social media. Through the CRM approach and the systems used to facilitate it, businesses learn more about their target audiences and how to best address their needs.

Enterprise CRM systems can be huge. Such systems can include data warehouse technology, used to aggregate transaction information, to merge the information with information regarding CRM products and services, and to provide key performance indicators. CRM systems aid managing volatile growth and demand and implement forecasting models that integrate sales history with sales projections. CRM systems track and measure marketing campaigns over multiple networks, tracking customer analysis by customer clicks and sales. Some CRM software is available through cloud systems, software as a service (SaaS), delivered via network and accessed via a browser instead of installed on a local computer. Businesses using cloud-based CRM SaaS typically subscribe to such CRM systems, paying a recurring subscription fee, rather than purchasing the system outright.

Despite their sheer size, many CRM systems today lack the infrastructure to make full use of the information they can access. Customer contacts alone, for example can be difficult to track. A tele-agent today does not limit customer contacts merely to phone calls from a desk in a call center. Such contacts are often administered through contact centers that can administer multiple modes of contact, phone, text, email, and so on, among multiple agents across multiple locations. When a particular tele-agent representing a contact center on behalf of a marketing client accepts a phone call from a customer representative, it is entirely possible that there may have been multiple intervening contacts with that customer representative, including text messages and emails or even automated messages from artificial intelligence agents, which may be very difficult for the current tele-agent to know or sort.

DETAILED DESCRIPTION

Figure 1:
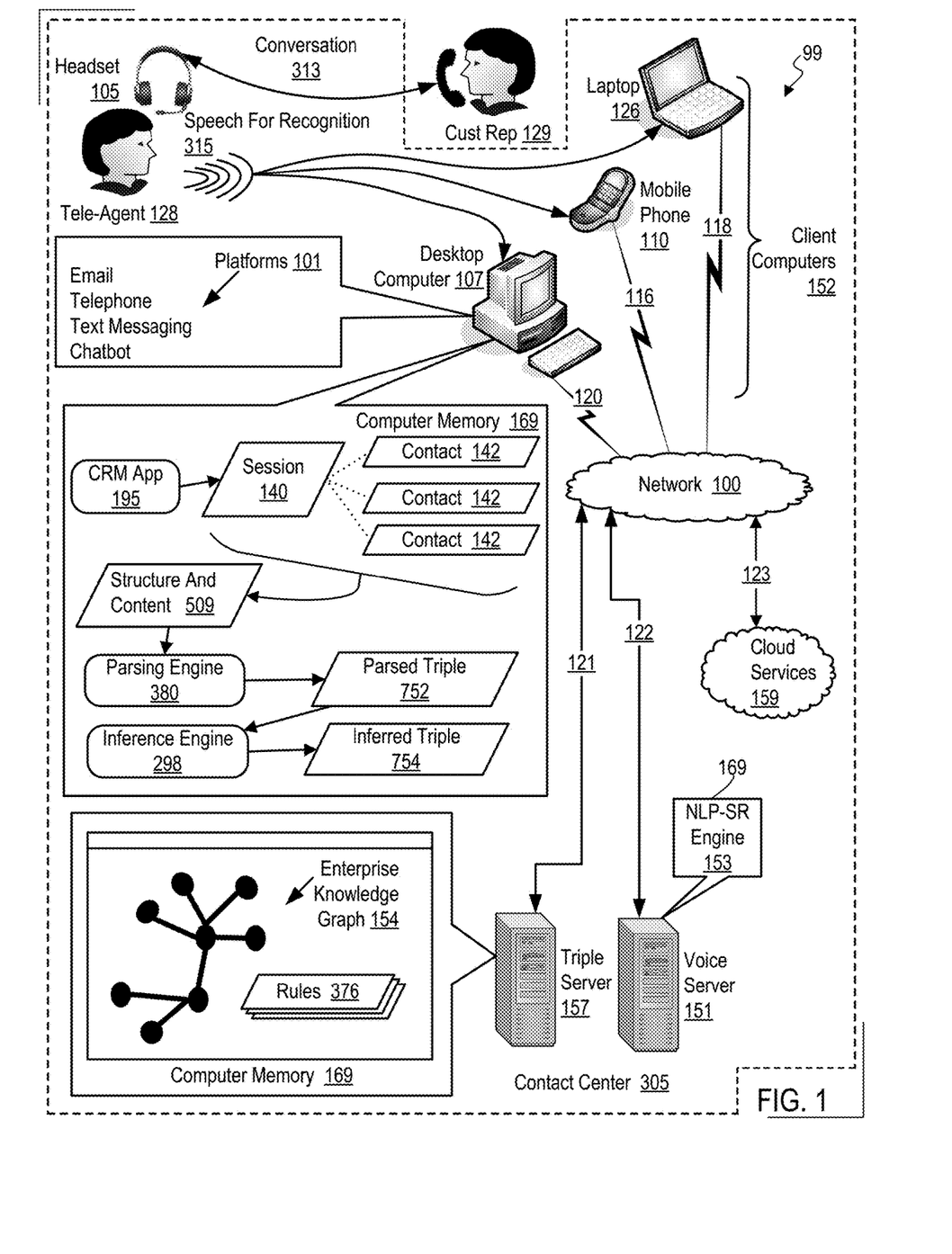
FIG. 1 is a functional block diagram of an example computer system that implements asynchronous multi-dimensional platform CRM according to embodiments of the present invention.

Referring to FIG. 1, an exemplary customer relationship management ("CRM") system provides an asynchronous multi-dimensional platform and administration system for customer and tele-agent communications that empowers a tele-agent to asynchronously move a single thread of conversation with a customer between live chart, text, email, and similar platforms. Furthermore, the tele-agent is provided at each platform with a transcript or partial transcript of the thread to aid in interaction with the customer.

Administering communications across platforms includes administering communication contacts asynchronously across a same platform or across different platforms, and administering across platforms includes administering across platform types. For example, communications platform types may be selected from a platform type group consisting of a telephone, an email, a text message, and/or a chatbot, as well as others, either extant or yet to be developed, as may occur to routineers in the art. Thus, a first communications contact in a session can be by telephone with a subsequent contact by the same telephone or a different telephone; and a first contact can be by email with subsequent contacts by telephone or text message. Similarly, administering contacts across platforms includes administering contacts across physical locations of platforms: A first contact of a session can be by landline telephone in a call center with a subsequent contact by cell phone in a restaurant; and a first contact can be by email from a desk in a call center with subsequent contacts by cell phone or text message from a supermarket. In all the above examples, the tele-agent is provided at each platform with a transcript or partial transcript of the thread to aid in interaction with the customer.

A tele-agent 128 is a person, an agent of a contact center 305, responsible for selling or supporting commercial products and services. A customer representative 129 is a person who represents a customer, a company or other enterprise that is a current or prospective purchaser of goods or services of contact center 305. CRM contact center 305 is an organization of personnel and computer resources that provide CRM according to embodiments of the present invention. In the example of FIG. 1, a region demarked by dotted lines indicates the extent of contact center 305. The extent is logical rather than physical. All of the resources and personnel that make up the contact center can have the same physical location, or the contact center can be highly virtualized, with separate physical locations for tele-agents, for client devices, and for servers, for example. Some or all tele-agents can work together in a call center that provides agents with desks, workstations, telephones, and so on. All or some of the tele-agents can work from home offices or from mobile locations.

A computer system 99 for CRM according to embodiments of the present invention includes client computers 152 and one or more servers, including a triple server 157 and a voice server 151. Computer system 99 may also include cloud services 159. Client computers 152 are automated computing machinery each configured for CRM with CRM-related I/O through a display, a graphical user interface, or a speech-enabled interface that accepts and recognizes speech from a user and optionally expresses to a user voice prompts and speech responses. Such devices are referred to as client devices because they implement the client side of computer architectures that carry out CRM according to embodiments. Client computers 152 in the example of FIG. 1 may include a desktop computer 107, a tablet (not illustrated), a mobile phone 110, and a laptop computer 126, any or all of which can serve as a workstation for tele-agent 128 carrying out CRM in, for example, contact center 305. Client computers 152 may be coupled for data communications by wireless connections 116, 118, 120 to a network 100 and in turn to triple server 157, voice server 151, and/or cloud services 159 via connections 121, 122, 123, respectively.

Automated computing machinery, as that phrase is used in this specification, means a module, segment, or portion of code or other automated computing logic, hardware, software, firmware, or the like, as well as a combination of any of the aforementioned, local or remote. Automated computing machinery is often implemented as executable instructions, physical units, or other computing logic for implementing specified logical functions.

A speech-enabled device is automated computing machinery configured to accept and recognize speech from a user and optionally to express to a user voice prompts and speech responses. Speech-enabled devices in the example of FIG. 1 may include desktop computer 107, tablet (not illustrated), mobile phone 110, and laptop computer 126, any or all of which can serve as a workstation for a tele-agent carrying out CRM in call center 305 or remotely.

Computer system 99 includes memory 169, which can include cache, random access memory ("RAM"), disk storage, and most other of computer memory, either extent or yet to be developed. For simplicity, FIG. 1 illustrates discrete memories 169 residing in desktop computer 107, in triple server 157, and in voice server 151, but a routineer will understand that memory 169, and the information stored thereby, may be distributed across any or all computing devices 107, 110, 126, 151, 157, 159 of computer system 99.

Computer memory 169 includes a CRM application 195, which is executed by computer system 99. In one or more embodiments, CRM application 195 may be hosted by one or more client computers 152, which is referred to as a thick-client implementation. In other embodiments, CRM application 195 may be hosted by triple server 157, voice server 151, and/or cloud services 159 in a thin client implementation. In this case, tele-agent 128 may access CRM application 195 using a web browser via hypertext mark-up language (HTML) and the like. Yet, in still other embodiments, CRM application 195 may consist of any number of discrete software modules distributed across and executed by each computing device 107, 110, 126, 151, 157, 159 of computer system 99, as known to routineers in the art.

Computer memory 169 of computer system 99 also includes a parsing engine 380, an inference engine 298, and a natural language processing speech recognition ("NLP-SR") engine 153. FIG. 1 illustrates parsing engine 380 and inference engine 298 being hosted by client desktop computer 107 in a thick-client implementation, but such may additionally or alternatively be hosted by triple server 157 and/or voice server 151. Similarly, NLP-SR engine 153 is illustrated as being hosted by voice server 151, but it may also be hosted in any suitable client computer 152. Speech-engine 153 is ideally a full-service NLP-SR engine that includes natural language processing, speech recognition, a grammar, a lexicon, a model, and text-to-speech processing, all as described in more detail in co-pending U.S. application Ser. Nos. 16/154,718 and 16/911,717, which is incorporated herein by reference.

In the example of FIG. 1, CRM application 195 establishes, upon a first communications contact between a tele-agent 128 and a customer representative 129, as structure of computer memory 169 of computer system 99, a communications session 140. CRM application 195 may then administer through the communications session 140 across communications platforms 101, as structure of computer memory 169 of computer system 99, a sequence of communications contacts 142, including the first contact, and also subsequent communications contacts, between the tele-agent and the customer representative. Examples of communications platforms 101 include email platforms, telephones, text messaging platforms, chatbots, and so on. Examples of text messaging platforms 137 that can be adapted as CRM communications platforms according to embodiments include SMS messaging clients that operate over telephone systems, web chat inline within a web application, and web-oriented messaging applications such as WhatsApp™, Facebook Messenger™, Slack™, Snapchat™, Cryptocat™, Kik™, Google Hangouts™, Line™, MeowChat™, Ethan™, China's WeChat™ and QQ Messenger™, Viber™, Korea's KakaoTalk™, Vietnam's Zalo™, as well as direct messaging functions in Instagram™ and Twitter™.

In one or more embodiments, CRM application 195 establishes, as structure of computer memory 169 of computer system 99, session 140 that is configured as an object-oriented module of automated computing machinery. That is, a session 140 in such embodiments is established, initially at least, as an instance of an object-oriented session class. Establishing such a session 140 entails storing in computer memory 169 session member data elements including a subject code, a timestamp, identification of the tele-agent, identification of the customer representative, and optionally other information regarding the session. CRM application 195 thereafter administers a sequence of contacts 142 by establishing each contact 142 as an object-oriented module within computer memory 169 of computer system 99. That is, contacts 142 are established as instances of an object-oriented contact class. Administering a sequence of contacts entails recording in computer memory 169 contact member data elements including a timestamp denoting the beginning the contact, a session identifier for the contact, platform type, contact status, any communications content of the contact, and optionally other information regarding the contact.

The structure and content 509 of a communication session 140, including first and subsequent contacts 142, may include transcripts or partial transcripts of words of text, spoken or typed, as well as images, digital text, and the like. Words can include those typed into a text box, words from email or text messages, or words of digitized speech for recognition 315 from a conversation 313. The speech for recognition can be the entire conversation, where, for example, both persons speaking are in the same room, and the entire conversation is picked up by a microphone on a speech-enabled device, or where a telephone conversation is recorded. The scope of speech for recognition can be reduced by providing to a speech-enabled device only one side of the conversation, as only through a microphone on a headset 105. The scope of speech for recognition can be further reduced by providing for recognition only speech that responds to a prompt from a VoiceXML dialogue executing on a speech-enabled client computer. As the scope of speech for recognition is reduced, data processing burdens are reduced across the system as a whole, although it remains an option, in some embodiments at least, to recognize the entire conversation and stream across a display a flow of all words in the conversation.

Speech from the conversation 313 is recognized into digitized words by operation of NLP-SR engine 153, shown here hosted by voice server 151, but also amenable to installation on speech-enabled client computers 152 or other devices. In addition to digitizing words by speech recognition functions of voice server 151, for a further example, words can be digitized by operation of widgets or by typing into a text entry box of a graphical user interface on a client computer 152.

In one or more embodiments, CRM application 195 also stores structure and content 509 of session 140 and associated contacts 142 as semantic triples in an enterprise knowledge graph 154 a follows: Structure and content 509 of communication session 140, including first and subsequent contacts 142, is parsed by parsing engine 380 into parsed triples 752; inference engine 298 analyzes parsed triples 752 according to rules 376 to create inferred triples 754. The parsed and inferred triples 752, 754 are stored in enterprise knowledge graph 154. Parsed triples 752, inferred triples 754, and enterprise knowledge graph 154 are described in greater detail hereinafter.

Client computer 153, voice server 151, triple server 157, CRM application 195, parsing engine 380, inference engine 298, and enterprise knowledge graph 154 are all described in greater detail in co-pending U.S. application Ser. Nos. 16/154,718 and 16/911,717, incorporated herein by reference.

Figure 2:
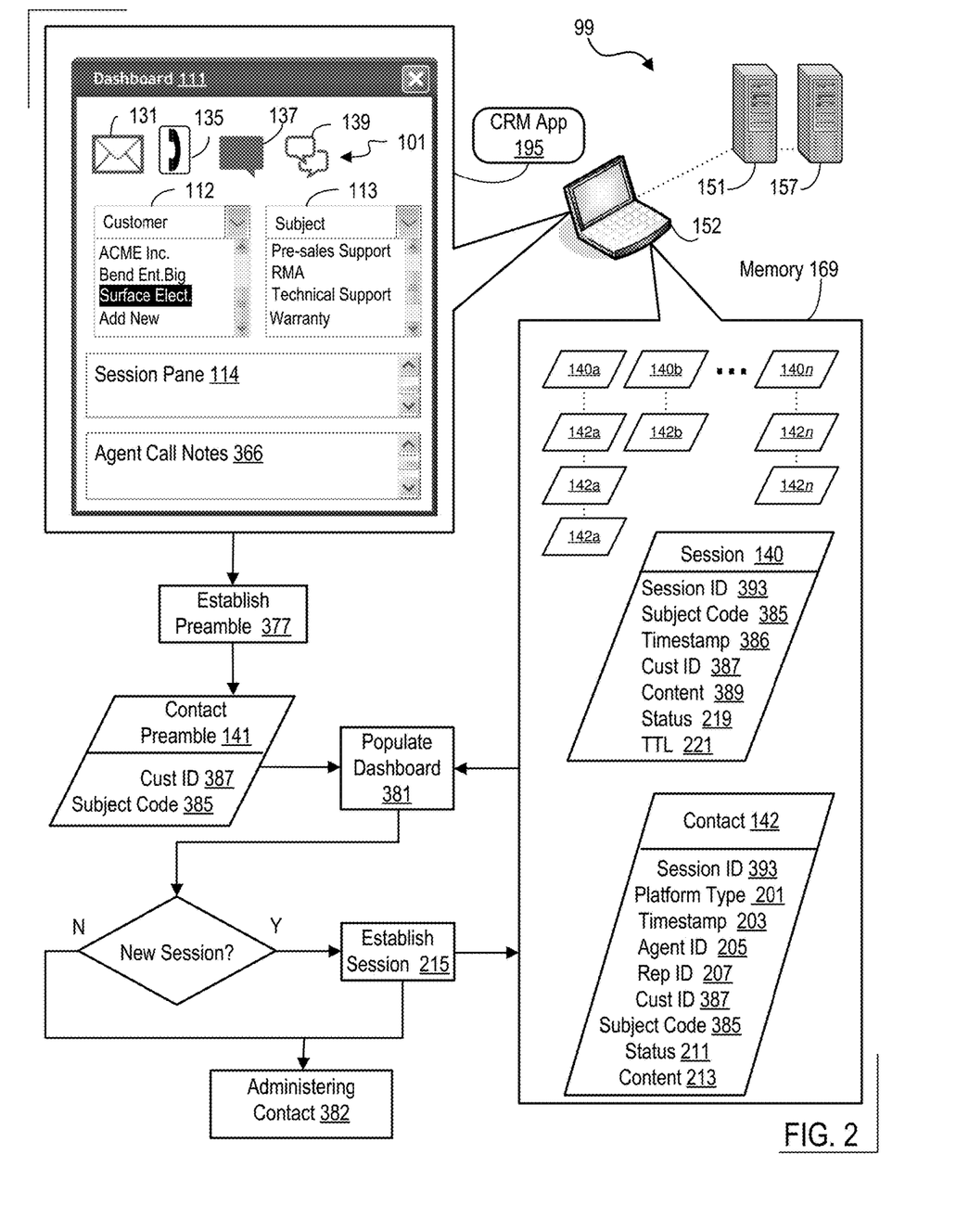
FIGS. 2 and 3 are flow charts illustrating an example method of asynchronous multi-dimensional platform CRM according to embodiments of the present invention.
Figure 3:
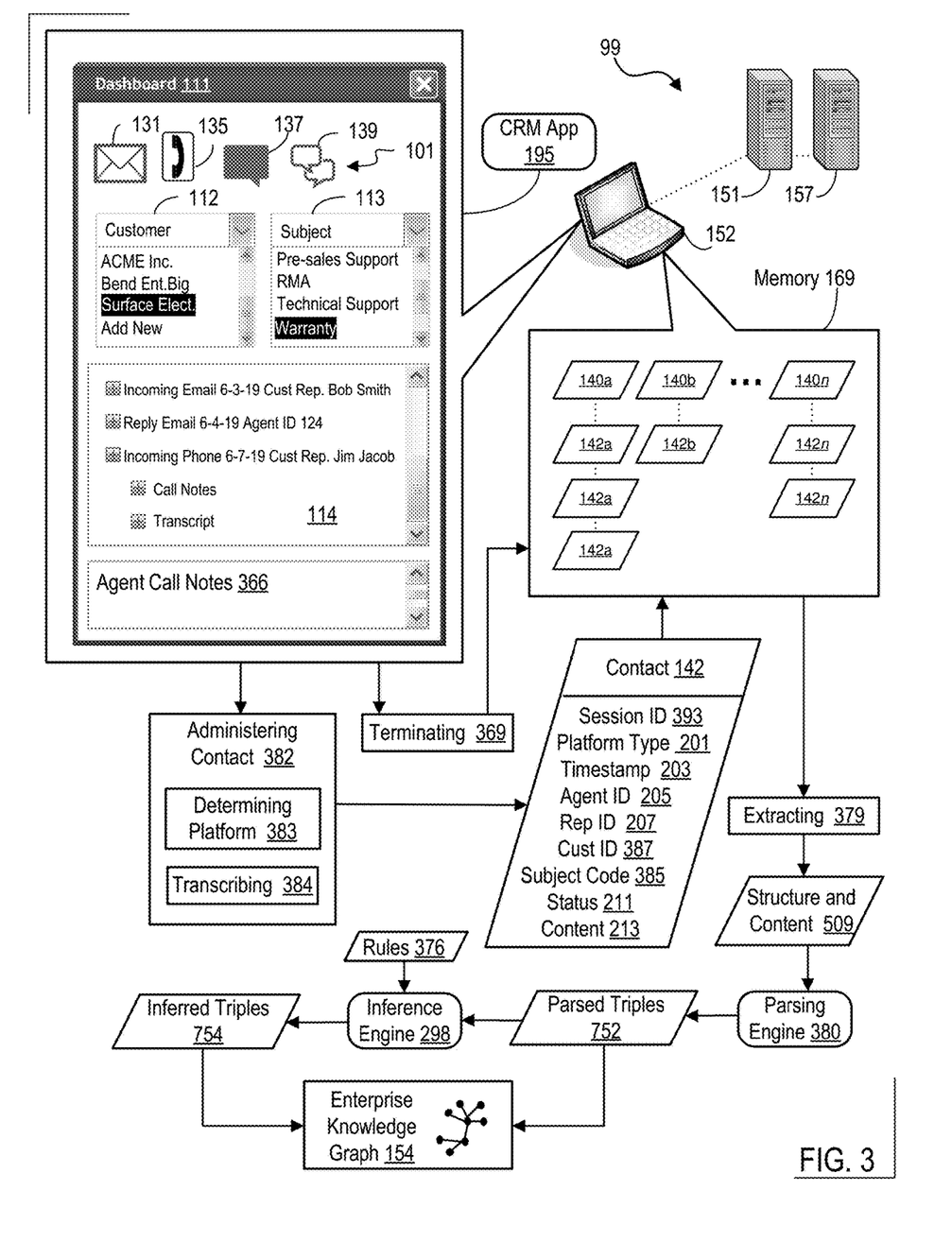

For further explanation, FIGS. 2 and 3 are flow chart diagrams illustrating an example method of CRM according to embodiments of the present invention. Functions in the method of FIGS. 2 and 3 are implemented by computer system 99, including some combination of a client computer 152, voice server 151, and triple server 157. That is, for example, a speech engine can be hosted by voice server 151 in a thin-client architecture or by client computer 152 in a thick-client architecture. Likewise, parsing and inference can be carried out either on triple server 157 or on a client computer 152. Except for the parsing and inferring, which are implemented respectively with parsing engine 380 and inference engine 298, the method processes in this example are implemented generally by CRM application program 195. The question exactly where any particular function occurs depends upon the particular architecture of system 99, although all structural elements are computers or components of computers, and they are all configured to operate together, in one architecture or another, to carry out CRM according to embodiments.

In the method of FIGS. 2 and 3, administration of a communications session 140 and its contacts 142 between one or more tele-agents and one or more customer representatives is carried out across various communications platforms 101. In the method of FIGS. 2 and 3, communications platforms 101 may include, for example, telephones, text messaging platforms, email platforms, and chatbots, as illustrated by graphical icons or graphical user interface ("GUI") widgets 131, 135, 137, 139, respectively. Text messaging platforms can include web chats through a web page exposed by the contact center, small message service (SMS) messages via telephone, or web-based text messaging in general through WhatsApp, Facebook Messenger, Snapchat, or the like. CRM application 195 administers all such platforms. CRM application 195 can open a phone contact responsive to a tele-agent's invoking a GUI widget 135 for a telephone. CRM application 195 can accept typed text input or voice messaging into email or text messages. CRM application 195 implements machine learning by parsing the structure and content of communications contacts into new semantic triples and inferring new inferred triples from the parsed triples.

Referring first to FIG. 2, the CRM method according to one or more embodiments includes advising a tele-agent upon request the status of communications for a given session 140. CRM application 195 may employ in widgets within a dashboard 111 to advise of all open sessions, closed sessions, contacts of each session, contents of each contact, and so on. In one or more embodiments, CRM application 195 can accept voice requests and return status by speech, e.g., "Computer, what is our communications status with Bob?" Answer: "You have no open session with Bob." Or, "You have an open session, the last contact was an email from you to him on March 25, no response. Shall I read you the email?"

More particularly, CRM application 195 establishes, as structure of computer memory 169 of computer system 99, a communications session 140 that links all communications between one or more customer representatives of a given customer and one or more tele-agents of a contact center having in common a particular subject, i.e., a particular thread of communication. That is, session 140 is an object—an instance of object-oriented session class. Over the course of time, multiple instances—communications sessions—140*a*, 140*b*, . . . 140*n* are stored in memory 169—one for each thread of communication with a customer.

Each session instance 140*a* . . . 140*n* has an associated first contact 142*a* . . . 142*n*, which are also configured as object-oriented modules of automated computing machinery. Depending on the thread of communications, each session 140*a* . . . 140*n* may also have one or more additional subsequent contacts 142*a* . . . 142*n*. Contacts 142 are objects instances of an object-oriented contact class. Contacts 142 may also include both instances of actual communications between a tele-agent and a customer representative and also failed attempts at such communication. Sessions 140 and contacts 142 contain member data elements, as follows.

Each session 140 includes a unique session ID 393 data element, which functions as a foreign key linking that session 140 to all contacts 142 associated with that session. Each contact 142 also has a session ID 393 which matches the session ID 393 of one of the sessions 140. The session 140 thus functions as a wrapper or container for all contacts 142 linked by the session ID 393, i.e., for contacts related to a customer and having a particular subject matter, including multiple contacts among multiple tele-agents and multiple customer representatives across multiple platforms.

Other session 140 member data elements ideally include a subject code 385 that identifies the subject of the contacts between agents of a contact center and a customer representative that form the session, a timestamp 386 that delineates when that session 140 is first created, and a customer ID code 387 that identifies the customer that is represented in contacts of the session, that is, represented by a customer representative in contacts between a customer representative and an agent. The session member data elements may also include a content element 389. A typical use for the content element 389 is to elaborate on the subject matter 385 of the session. Session 140 can also include a time limit 221, represented here as a time-to-live or "TTL," after which the session is either terminated or a user is notified of a timeout and prompted whether to terminate the session. A session can also include a status code 219 to indicate whether the session is active or terminated. Terminated sessions retained in storage optionally can be configured to be reactivated.

Contact 142 member data elements ideally also include a platform type 201 (such as email, telephone, text messaging, and chatbots), a timestamp 203 indicating the beginning time of the contact, a tele-agent ID 205, a customer representative ID 207, a customer ID 387, a subject code 385, a status flag 211, and content 213 of the contact.

As shown in FIG. 2, CRM application 195 generates a dynamic dashboard display 111 on client computer 152. In a thin-client architecture, dashboard 111 may be displayed in a web browser and be generated suing hypertext markup language (HTML) forms, cascading style sheets (CSS) and Java, PHP, Perl or similar scripting languages, as known to routineers in the art. A browser plugin or application programming interface (API) may also be used as appropriate. In a thick-client architecture arrangement, CRM application 195 may directly generate a dashboard display 111 on client computer 152. Regardless, dashboard display 111 ideally employs ideally employs standard windows-type display and control mechanisms including windows, client windows, frames, flexboxes, icons, buttons, check boxes, radio buttons, scroll bars, drop-down menus, pull-down menus, drill-down mechanisms, tabs, bar graphs, panes, panels, forms, slide bars, selection boxes, dialog boxes, text boxes, list boxes, menu bars, bar graphs, widgets, wizards, et cetera. The selection and layout of the user interface components, and the placement thereof, may vary widely within the scope of the present disclosure and may optionally be customized by each user. Ideally, CRM application 195 employs responsive site design techniques so as to automatically adjust layout and design to be readable and usable at any screen width. As user interface programming and design are well known in the art, further detail is omitted.

In one or more embodiments, dashboard 111 includes customer display and control mechanism 112 by which a customer can be identified and selected. Customer display and control mechanism 112 may be used for placing outgoing communications from a tele-agent to a customer representative in conjunction with selection of one of the platform icons 131, 135, 137, 139. Although not illustrated for brevity, customer display and control mechanism 112 may allow drilling down to display and allow selection from various customer representatives associated with the selected customer. Associated contact information such as email address, phone numbers, IP address, etc. may be stored by CRM application 195 to facilitate initiating a contact. In one or more embodiments, communications contacts can be implemented through speech alone without GUI operations, including specifying platform types. A tele-agent can issue oral instructions to CRM application 195: "Computer, email Bob and ask to schedule a call." "Computer, text Bob and ask him to reschedule our call." "Computer, ring Bob for me and if he doesn't answer, leave a message asking for a call back." Each of these examples expressly identifies a platform type 101, respectively, email, text message, and telephone.

Customer display and control mechanism 112 may also be used to notate the customer when an incoming contact is received from a customer representative. However, customer identification may also be facilitated in part or in whole by automated recognition of email address, phone caller ID, voice identification, or the like, as known in the art. FIG. 2 illustrates customer display and control mechanism 112 as consisting of a drop down menu, however other widgets or mechanisms may be used as appropriate.

Once the customer is selected, CRM application 195 populates a subject display and control mechanism 113, by which the tele-agent may view and select the session 140 to which the incoming or outgoing contact is associated. CRM application 195 initially populates subject display and control mechanism 113 by searching memory 169 for sessions 140 having the customer ID 387 that matches the customer ID associated with the customer selected at the customer display and control mechanism 112. Of these matching sessions 140, the subject codes 385 are mapped to options within subject display and control mechanism 113 that can be selected by the tele-agent. Optionally, closed or terminated sessions may selectively be shown within subject display and control mechanism 113, thereby allowing the tele-agent to reopen a closed matter. Although not illustrated, a option to add a new subject is also provided. CRM application 195 may optionally propose a suggested option within subject display and control mechanism 113 by the context of an incoming email, by the customer representative, or using the most recent subject, for example.

At the commencement of a contact with a customer, at step 377 CRM application 195 establishes a contact preamble 141. Contact preamble is a subset of an instance of a contact 142, and it includes the customer ID 387 and subject code 385. In the example of FIG. 2, the customer ID 387 and subject code 385 are selected via the customer and subject display and control mechanisms 112, 113, respectively. Once customer ID 387 and subject code 385 are set, the session 140 is fixed; at step 381, CRM application 195 queries memory 169, retrieves information from all contacts 142 associated with the identified session 140, and displays the data within a session pane 114 on dashboard 111. For a new session, i.e., upon a first contact among what is expected to be multiple contacts regarding a particular subject matter and a particular customer, the query would return no data, and session pane 114 would initially remain blank. In this case, at step 215, CRM application 195 creates a new instance of session 140 for this transaction, assigning it a unique session ID 393, timestamp 386, and other member data as described above. Program flow then proceeds to step 382, administering the contact.

By querying session data and populating session pane 114 as soon as the session can be identified, steps 377 and 381 allow the tele-agent to efficiently review relevant history of contacts with the customer regarding a particular subject, regardless of the tele-agent, customer representative, or platform associated with the earlier contacts, prior to commencing a new outgoing communication with the customer. Such may facilitate drafting a reply email or text message for example. For incoming communications, rapid display and organization of the previous contacts within session pane 114 allows quicker and more effective handling of the contact.

FIG. 3 illustrates session pane 114 populated with data from associated contacts 142 of a session 140 as a result of step 381. Referring to FIG. 3, the contacts' listed data may include timestamps 203, platform types 201, tele-agent IDs 205, customer-representative IDs 207, and contact contents 213. For each contact 142, content 213 may include, tele-agent call notes 366, a transcript or partial transcript of the contact, photographs, videos, other attachments, and the like. The contacts 142 are shown listed in chronological order, although they may selectively be sorted according to platform type, customer representative, tele-agent, or other key. Session pane 114 shows the contacts arranged in a scrollable nested, drill-down list, although other mechanisms for displaying and organizing the data may be used as appropriate.

At the administering step 382, CRM application 195 first generates a new instance of a contact 142 and records therein the session ID 393, the customer ID 387 and the subject code 385. The tele-agent identification code 205 may be determined from the tele-agent credentials used to log in to dashboard 111, and CRM application 195 records the tele-agent ID 205 in the contact 142. The customer representative ID may be determined from the source of an incoming communication, such as by caller ID or email address, or it may be selected by the tele-agent via dashboard 111, such as by drilling down on customer display and control mechanism 112 to select the appropriate customer representative; it is recorded by CRM application 195 in the contact 142.

In the method of FIG. 3, step 382, administering communications contacts, in embodiments includes the step of determining 383 a communications platform type 201 for the communications contact 142. For outgoing communications, communications contacts can be implemented through CRM application 195, and determining a platform type can be by user GUI operation via dashboard 111. That is, a platform can be expressly selected by a tele-agent's selecting the desired platform 101 by selecting the email widget 131, the phone widget 135, the text widget 137, the chatbot widget 139, and so on. For example, a tele-agent can select particular customer representative from a contacts list or from customer display and control mechanism 112, and CRM application 195 can then note the intended representative identification 207 in the contact 142 and infer from the selection of phone widget 135 that the platform type is a telephone. When phone widget 135 is selected, CRM application may automatically dial the telephone to connect the tele-agent to the selected customer representative and record the platform type 201 in the contact 142. Likewise, having selected a desired customer representative, selection of the email widget 131 causes CRM application 195 to open a email window for composing an email, selection of the text widget 137 causes CRM application 195 to open a text message application window for composing a text message, selection of the chatbot widget 139 causes CRM application 195 to connect a chatbot application with the representative, and so on. When an email or text message is sent or chat is successfully established, CRM application 195 records the corresponding platform type 201 in the contact 142. For incoming communications to the tele-agent, the platform type 201 data variable may be determined by CRM application 195 by its nature; i.e., text, phone, email, etc.

Similarly, timestamp 203 is the reception time of incoming communications, and the time of submission (e.g., when an email is sent or a phone call is placed) for outgoing communications. CRM application 195 records platform type 201 and timestamp 203 in the contact 142.

The content 213 of communications in the contacts 142 may include the content of texts, chats, emails, with or without attachments, and voice communications. Contents 213 are captured by CRM application 195 and stored in association with the contacts themselves 142, rather than in a session 140 object. To the extent that the content 213 of a communications contact is speech, the speech may be recorded raw and/or recognized into a text transcript, the text then being stored as element 213 of contact 142. More particularly, to generate a transcript, CRM application 195, using a speech engine, recognizes words from a conversation between a tele-agent and a customer representative into digitized speech. Speech recognition may be carried out as follows: Words of speech from the conversation travel through a microphone and amplifier of computer 152 and, in a thin-client architecture, through a VOIP connection to voice server 151 where a speech recognition engine recognizes the words into a stream of digitized speech, which is handed off to natural language processing ("NLP") engine 153 (FIG. 1) that processes the digitized speech into sentences and parts of speech comprising a transcript. Later in processing, as described below, the transcript may be implemented as semantic triples, but the digital transcript is initially an object-oriented instantiation of an object of a transcript class having member data elements. The digital transcript's member data elements may include content from text messaging, chatbots, and email identified by author, as well as content from telephone conversations identified by speaker.

Additionally, in one or more embodiments, CRM application 195 may automate speaker recognition by implementing a speech recognition function running in a loop with current voice print extraction and comparison with previously stored voice prints of known speakers. For a new speaker with no voice print on record, a computer according to embodiments can take speaker identification from context, e.g., a tele-agent telephoned a particular customer representative selected from an address list. Alternatively for a new speaker with no voice print on record, CRM application 195 according to embodiments can prompt for identification. Other ways to associate a new speaker with a voice print may occur to routineers, and all such ways are well within the scope of the present invention.

In one or more embodiments, dashboard 111 includes a call notes text entry box or widget 366 into which the tele-agent can type notes before, during, or following a communication contact with a customer representative. The administering step 382 also records such call notes in the content field 213 of the corresponding contact 142.

The status code 211 of contact 142 can be used to indicate success or failure of a contact and is recorded by CRM application 195. The contact structure in this example includes identification codes for the tele-agent who initiated the contact and the customer representative who was sought to be contacted. CRM application 195 with voice enablement can indicate in response to a status query from a tele-agent, "You tried him last Wednesday and left a message, but we have had no further contact."

In the method of FIG. 3, CRM application 195 may also selectively include step 369 of terminating a session 140 and associated contacts 142. According to a tele-agent instruction to do so, CRM application 195 through the administration process 382 can mark session status 219 of a session 140 as "terminated" or "inactive" or the like. CRM application 195 can also terminate a session according to a time-out, that is, a predetermined duration for a session, implemented for example by comparing a timestamp 386 when the session was initiated with a time-to-live 221 element and the current date and time, optionally advising a tele-agent of the time-out, and asking whether to terminate. As described hereinafter, the structure and content 509 of sessions 140 and contacts 142 are parsed, inferred and stored as semantic triples in an enterprise knowledge graph. Accordingly, once terminated, the particular object-oriented module instances session 140 and associated contact(s) 142 may be deleted or archived without loss of knowledge, thereby easing database management requirements.

Although not illustrated, the method of FIG. 3 can also include reactivating a terminated session 140, by, for example, marking pertinent status triples in the knowledge graph 154 (FIG. 1) as "active" rather than "inactive" or even retrieving pertinent triples from the knowledge graph and, based upon them, rebuilding an object-oriented session object plus all its contact objects.

In many embodiments, the structure and content 509 of the session 140, typically including all session 140 data elements and associated contact 142 data elements, are stored as semantic triples in an enterprise knowledge graph 154. Enterprise knowledge graph 154 is composed of triples of a description logic that includes all CRM-related knowledge that is available to a tele-agent through CRM system 99. For example, enterprise knowledge graph 154 may include type-coded subgraphs that are implemented as logically-connected segments of the overall knowledge graph. All the nodes and edges in enterprise knowledge graph 154 are elements of semantic triples. Enterprise knowledge graph 154 may include subgraphs type-coded as customer information and customer representative information. These subgraphs are merely examples, not limitations of enterprise knowledge graphs. Enterprise knowledge graphs also will typically include financials, vendor information, business entities and structures, project information, corporate guidelines and manuals, employee data, incorporation data, transactions, contracts, sales histories, research details, and so on, and so on, and so on. In some embodiments, the storing process disposes at least some subgraphs of structure and content of session and communications contacts within the overall enterprise knowledge graph within segments of contiguous computer memory.

Enterprise knowledge graph 154 is a semantic graph database—a database that uses graph structures for semantic queries with nodes, edges and properties to represent and store data. A key concept of this database system is the graph (or edge or relationship), which directly relates data items in a data store. The relationships allow data in the store to be linked together directly, and in many cases retrieved with one operation. Such a graph database contrasts with conventional relational databases, where links among data are mere indirect metadata, and queries search for data within the store using join operations to collect related data. Graph databases, by design, make explicit relations among data and allow simple and fast retrieval of complex hierarchical structures that are difficult to model in relational systems. Enterprise knowledge graph 154 is described in detail in co-pending U.S. application Ser. Nos. 16/154,718 and 16/911,717,which are incorporated herein by reference.

Accordingly, as indicated at step 379, CRM application 195 first extracts structure and content 509 from session 140 and associated contact 142 data elements, typically as the object instances are created, i.e., written to memory 169. The structure and content 509 include words of communications contacts from the CRM application 195. Contacts 142 are said to present in a sequence because they present serially in time, one after another. The structure and content 509 of the communications session 140, including the structure and content 213 of the communications contacts 142, is then parsed by parsing engine 380 of computer system 99 into parsed triples 752, i.e., as element having a subject, a predicate, and an object, of a description logic. That is, the parsing process can function by forming into semantic triples 752 words designated by natural language processing engine 153 as parts of speech—subject, predicate, object. The parsing process can also function by forming into semantic triples 752 words designated through voice commands in a VoiceXML dialog or words designated through GUI widgets as element of triples—subject, predicate, object. In at least some embodiments, the description logic is a member of a family of formal knowledge representation languages in which a query of the logic is decidable. The parsing process is described in detail in co-pending U.S. application Ser. Nos. 16/154,718 and 16/911,717,which are incorporated herein by reference.

The parsed triples 752 may next be forwarded to inference engine 298, which generates inferred triples 754 from the parsed tripled 752 according to inference rules 376. In many embodiments, the parsing process hands off the parsed triples 752 to the inference engine 298 by disposing the parsed triples in segments of contiguous memory and providing to the inference engine 298 the memory addresses for the segments. Parsed and inferred triples 752, 754 are ultimately stored in enterprise knowledge graph 154.

As noted above, the method of FIG. 3 may also include inferring, by inference engine 298 from the parsed triples according to inference rules 376 associated an enterprise knowledge graph 154 of computer system 99, inferred triples 754. The inferencing process is described in detail in co-pending U.S. application Ser. Nos. 16/154,718 and 16/911,717,which are incorporated herein by reference. One effect of running inference against the smaller sets of triples parsed from transcripts, sessions 140 and/or contacts 142 is to reduce the burden of running inference rules against an entire enterprise knowledge graph. Inferring triples in the smaller chunks of data represented by sessions and contacts is a much smaller data processing task than running inference rules against an entire enterprise knowledge graph, and yet inferring triples in the smaller chunks of data represented by sessions and contacts generates inferred triples that are identical to triples inferred by running inference rules against an entire enterprise knowledge graph.

In the method of FIG. 3, administering 382 across platforms can be carried out by administering across platform types 101. A tele-agent can implement with a customer representative a sequence of contacts, each of which can be by a same platform or platform type, all on telephone, or each of which can be by different platforms, such as phone, email, text, and so on. CRM application 195 and the administration function 382 handle all platform types equally, even in a sequence of contact by a same tele-agent with a same customer representative.

In the method of FIG. 3, administering contacts across platforms can be carried out by administering contacts asynchronously across platforms. That is, timing is not a limitation of the functionality of CRM according to embodiments. A tele-agent can phone a same customer representative today with the call administered, a contact established, contents recorded, elements parsed, triples stored, and so on. The tele-agent can email the same customer representative tomorrow with the email administered, a contact established, contents recorded, elements parsed, triples stored, and so on. The tele-agent can text the same customer representative the next day with the text message administered, a contact established, contents recorded, elements parsed, triples stored, and so on. CRM application 195 and the administration function 382 work asynchronously across platforms.

In the method of FIG. 3, administering 382 sessions and contacts across platforms can be carried out by administering contacts across physical locations of platforms. That is, location is not a limitation of the functionality of CRM according to embodiments. A tele-agent can phone a same customer representative today from an automobile on a freeway with the call administered, a contact established, contents recorded, elements parsed, triples stored, and so on. The tele-agent can email the same customer representative tomorrow from an agent's desk in a call center with the email administered, a contact established, contents recorded, elements parsed, triples stored, and so on. The tele-agent can text the same customer representative the next day by use of the agent's smart phone in the agent's home office with the text message administered, a contact established, contents recorded, elements parsed, triples stored, and so on. CRM application 195 and the administration function 382 work regardless of the physical location of a platform.

The Abstract of the disclosure is solely for providing the a way by which to determine quickly from a cursory reading the nature and gist of technical disclosure, and it represents solely one or more embodiments.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of customer relationship management ("CRM") implemented in a computer system, the method comprising:
    administering by the computer system a communications session comprising a first and a subsequent communications contact between one or more tele-agents and one or more customer representatives, the session and the first and subsequent contacts comprising a structure of computer memory of the computer system; and
    generating by the computer system a first digital transcript of the content of the first contact;
    displaying by the computer system to the one or more tele-agents the first digital transcript of the content of the first contact during the subsequent contact; and then
    generating by the computer system a second digital transcript of the content of the subsequent contact;
    wherein administering a communications session comprises establishing, as structure of computer memory of the computer system, the session, the first, and the subsequent contacts as object-oriented modules of automated computing machinery.

2. The method of claim 1 wherein:
    the first communications contact occurs with a first tele-agent; and
    the subsequent communications contact occurs with a second tele-agent.

3. The method of claim 1 wherein:
    the first communications contact occurs with a first customer representative; and
    the subsequent communications contact occurs with a second customer representative.

4. The method of claim 1 wherein:
    the first communications contact occurs over a first communications h from a platform type group consisting of a telephone, an email, a text message, and a chatbot; and
    the subsequent communications contact occurs over a second communications platform type from the platform type group.

5. The method of claim 1 wherein:
    the first communications contact occurs and the subsequent communications contact occur asynchronously over time.

6. The method of claim 1 wherein administering a communications session comprises:
    storing in computer memory for the session a session identification, a subject code, a timestamp, an identification of a customer, and a status; and
    storing in computer memory for each contact a timestamp, the session identifier for the contact, a platform type, a tele-agent identification, a customer representative identification, a status code, and any communications content of the contact.

7. The method of claim 1 wherein generating the first digital transcript comprises:
    gathering text content from communications by text message, email, or chatbot.

8. The method of claim 1 wherein generating the first digital transcript comprises:
    capturing speech content from telephone conversations between the one or more tele-agents and the one or more customer representative; and
    recognizing the speech content into digitized text.

9. The method of claim 8 wherein generating the first digital transcript comprises:
    identifying by voiceprint comparison the speakers in a conversation between the one or more tele-agents and the one or more customer representatives.

10. The method of claim 1 further comprising:
    parsing, by a parsing engine of the computer system into parsed triples of a description logic, the content of the first digital transcript;
    inferring, by an inference engine from the parsed triples according to inference rules of said enterprise knowledge graph of the computer system, inferred triples; and
    storing the parsed triples and the inferred triples in the enterprise knowledge graph.

11. A computer system that implements customer relationship management ("CRM"), the computer system comprising a computer processor operatively coupled to computer memory, the computer processor configured to function by:
    administering by the computer system a communications session comprising a first and a subsequent communications contact between one or more tele-agents and one or more customer representatives, the session and the first and subsequent contacts comprising a structure of computer memory of the computer system; and
    generating by the computer system a first digital transcript of the content of the first contact;
    displaying by the computer system to the one or more tele-agents the first digital transcript of the content of the first contact during the subsequent contact; and then
    generating by the computer system a second digital transcript of the content of the subsequent contact;
    wherein administering a communications session comprises establishing, as structure of computer memory of the computer system, the session, the first, and the subsequent contacts as object-oriented modules of automated computing machinery.

12. The computer system of claim 11 wherein:
    the first communications contact occurs with a first tele-agent; and
    the subsequent communications contact occurs with a second tele-agent.

13. The computer system of claim 11 wherein:
the first communications contact occurs with a first customer representative; and
the subsequent communications contact occurs with a second customer representative.

14. The computer system of claim 11 wherein:
the first communications contact occurs over a first communications platform type from a platform type group consisting of a telephone, an email, a text message, and a chatbot; and
the subsequent communications contact occurs over a second communications platform type from the platform type group.

15. The computer system of claim 11 wherein:
the first communications contact occurs and the subsequent communications contact occur asynchronously over time.

16. The computer system of claim 11 wherein administering a communications session comprises:
storing in computer memory for the session a session identification, a subject code, a timestamp, an identification of a customer, and a status; and
storing in computer memory for each contact a timestamp, the session identifier for the contact, a platform type, a tele-agent identification, a customer representative identification, a status code, and any communications content of the contact.

17. The computer system of claim 11 wherein generating the first digital transcript comprises:
gathering text content from communications by text message, email, or chatbot.

18. The computer system of claim 11 wherein generating the first digital transcript comprises:
capturing speech content from telephone conversations between the one or more tele-agents and the one or more customer representative; and
recognizing the speech content into digitized text.

19. The computer system of claim 18 wherein generating the first digital transcript comprises:
identifying by voiceprint comparison the speakers in a conversation between the one or more tele-agents and the one or more customer representatives.

20. The computer system of claim 11 wherein the computer processor is further configured to function by:
parsing, by a parsing engine of the computer system into parsed triples of a description logic, the content of the transcript;
inferring, by an inference engine from the parsed triples according to inference rules of said enterprise knowledge graph of the computer system, inferred triples; and
storing the parsed triples and the inferred triples in the enterprise knowledge graph.

\* \* \* \* \*